Feb. 20, 1968  R. C. SLAUTTERBACK  3,369,940
MULTIPLE VENT PLUGS FOR BATTERIES
Filed March 15, 1967

INVENTOR.
ROBERT C. SLAUTTERBACK
BY
D. Henry Stoltenberg
ATTORNEY

United States Patent Office 3,369,940
Patented Feb. 20, 1968

3,369,940
MULTIPLE VENT PLUGS FOR BATTERIES
Robert C. Slautterback, Toledo, Ohio, assignor to Eltra Corporation, Toledo, Ohio
Continuation-in-part of application Ser. No. 415,599, Dec. 3, 1964. This application Mar. 15, 1967, Ser. No. 623,411
3 Claims. (Cl. 136—177)

ABSTRACT OF THE DISCLOSURE

A removable multiple venting and filling device for a battery, having a closed chamber in gas communication with each of the battery cells, the base of the chamber having depending flanges which fit within and frictionally engage the vent openings of the cells to position the device on the battery. A unitary hinged cover with vent apertures is attached to the base to permit access to the cells for inspection and filling. The cover is provided with pairs of concentric depending baffles which, when the cover is in closed position, extend into each of the battery vent openings to prevent splashing of the battery electrolyte in the cells to the battery exterior but which permit egress of the gas formed in the cells. The pairs of baffles form, with the depending flanges below them, restricted passages at an angle to each other to prevent electrolyte from splashing out the vent apertures in the cover.

---

This application is a continuation-in-part of application Ser. No. 415,599 for Multiple Vent Plugs for Batteries, filed Dec. 3, 1964, now abandoned, by the same inventor.

With the advent of 12 volt batteries with their six cells, the problem of servicing the batteries by gas station attendants has become burdensome due to the amount of time required to remove the single closure plugs for the six cells, service the cells and replace the closure plugs. A solution to this problem which has been suggested involves an elongated strip to which all of the single closure plugs are permanently attached so that all plugs can be removed at one time by jerking the end of the strip, which saves some time for the process of opening the vents, but the time required to replace the plugs after servicing is still too burdensome. This has resulted in careless servicing of the batteries with only the center cells being "spot" checked.

The present invention provides a means for opening and closing the ganged vent closures of a multicell battery which permits performing this operation with facility and certainty, so that efficient servicing of a battery by a gas station is assured. The invention also provides an efficient means for permitting egress of accumulated gas in the cells and also prevents splashing of the electrolyte from the cells.

The invention further provides a ganged vent closure for batteries which can be cheaply manufactured on a mass production line to dimensions and of materials which will allow the means to be fitted to batteries with suitable fits to assure successful operation.

It is therefore a principal object of this invention to provide a ganged vent closure means for multicell batteries wherein a single hinged cover opens and closes a multiplicity of venting and filling openings of the multicell battery, and also provides an efficient venting means for the cells to allow egress of the gases formed in the cells.

It is a further object of this invention to provide a ganged vent closure means for a multicell battery, which has a base receptacle and a hinged cover means which can be molded as an integral unit.

It is a further object of this invention to provide a gang type filling and venting means for a multicell battery which has a common chamber for all the cells having a base with depending flanges adapted to frictionally fit into the filling openings in the cell covers to hold the device in fixed position on the battery, the base being provided with integral hinges to hold an integral one piece cover in movable juxtaposition therewith, to allow the openings in the cell covers of the battery to be opened for servicing and then simultaneously covered and sealed by the hinged one piece cover moving about the hinges, the cover having depending flanges extending into the flanges on the base, the relation being such that electrolyte splashing is prevented yet allowing egress of gas from the cells.

Referring to the drawings.

Figure 1:
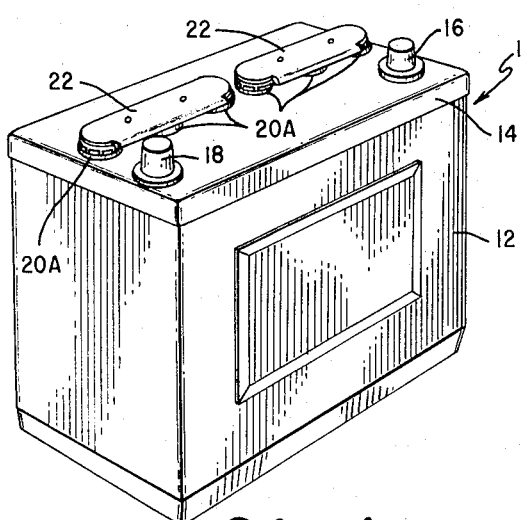
FIG. 1 is an isometric view of a multicell battery having a one-piece cover to which the invention has been applied.

Referring to FIGURE 1 of the drawings, a conventional lead-acid 12 bolt battery 10 is shown suitable for use with automotive vehicles having a case 12, a cover 14 permanently affixed to the case 12, and a pair of output terminals 16 and 18 projecting from the upper surface of the cover 14. As is well known a standard 12 volt battery consists of 6 cells of 2 volts each which are connected in series by lead straps (not shown) positioned beneath the cover 14, with each cell being provided with a conventional filling and venting opening 20, the construction of which is shown in cross section in FIGURE 5. The opening 20 is provided with the upwardly extending boss 20A, and a downwardly extending slotted tube 20B which terminates at a ledge 20C to aid an operator in determining the electrolyte level in the cell. The gas generated in the individual cells of the battery is vented to the atmosphere through the opening 20, and also an operator is enabled to replenish the electrolyte in the cell by adding water through the opening to raise the electrolyte level to the desired degree.

Figure 3:
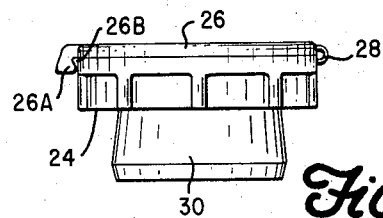
FIG. 3 is an end elevation view.
Figure 2:
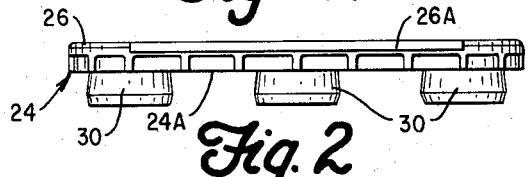
FIG. 2 is a side elevational view of the gang type venting and filling means removed from the battery.

All six of the openings 20 with their bosses 20A are shown in aligned transverse relation in the cover 14, which allows the use of a single gang vent plug to cooperate with all openings if such is desired, but for purposes of convenience, a gang vent plug 22 covering three of the cell openings is preferable and the invention will be disclosed in relation thereto. Referring to FIGURES 2 and 3, the gang vent plug 22 is shown in elevation, consisting of three parts integrally molded together, viz, a base receptacle 24, a cover 26 and hige 28. The base receptacle 24 is provided with three depending tubular flanges 30 which are spaced in the base 24A of the receptacle 24 to fit into the filling and venting openings 20 of three adjoining cells of the battery as is best seen in FIGURE 5, the flanges 30 being slightly flared and so dimensioned to provide a frictional fit into the openings 20 which will hold the gang vent plug in operative position on the battery.

Figure 4A:
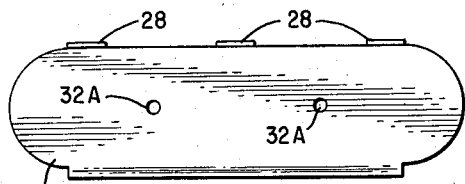
FIG. 4A is a plan view with the cover closed.
Figure 4:
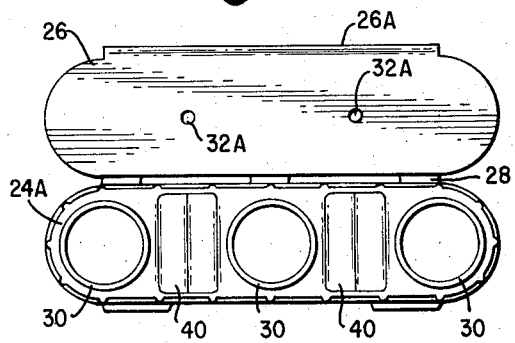
FIG. 4 is a bottom plan view of the gang type venting and filling means with the cover open.

The base 24A of the receptacle 24 is generally of flat conformation with rounded ends as shown or square ends or other contour if desired, having a continuous side wall 24B to form a chamber 32 which places the three filling and venting openings 20 of the three cells of the battery in communication with each other to provide a common chamber. In order to save material, the side wall 24B is given a thick upper terminal flange 24C (FIGURE 5) which is attenuated therebelow to a thinner wall section but provided with vertical ribs for additional strength. The cover 26 is adapted in part to abut against the upper surface of the flange 24C as shown in FIGURE 3 being held in cooperative relation with the base 24A of the receptacle 24 by integral strap hinges 28 as best seen in FIGURES 4 and 4A, which allow the cover to move from open to closed position by the flexing of the hinges 28. The cover 26 is provided with a depending latch member 26A which interlocks with a horizontal outwardly projecting rib 26B positioned on the upper edge of the flange 24C opposite from the hinges 28 to hold the cover in closed position.

To vent the chamber 32 when the cover 26 is in closed latched position, two apertures 32A are provided in the cover 26, positioned to be disposed over the apexes of gable-like protrusions 40 integrally formed in the floor 24A of the receptacle 24, which are located between the flanges 30 cooperating with the cell apertures 20. Any acid which may collect on the protrusions 40 will drain back into the cells of battery.

Figure 6:
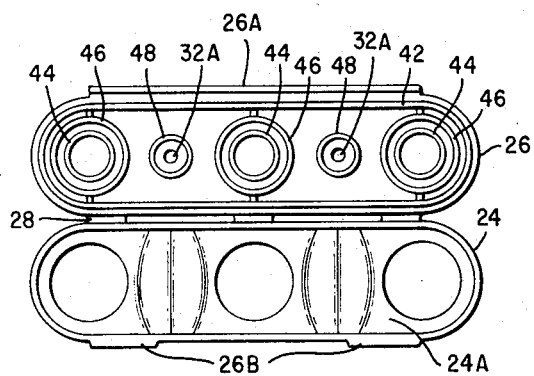
FIG. 6 is a plan view of the device with the cover open.
Figure 5:
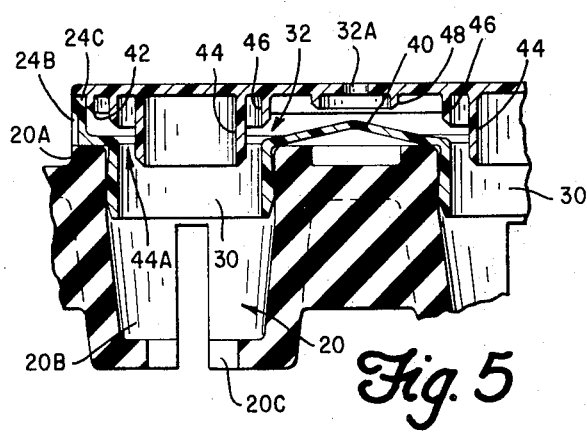
FIG. 5 is an elevational view partly in section of the device shown in relation to the battery cover.

The cover 26 as shown in FIGURES 5 and 6 is provided with a circumferential depending flange 42 adapted to fit within the upper flange 24B of the receptacle when the cover is in closed position to provide a better seal between the two members. The cover may also be provided with concentric depending flanges 44 and 46 to center on each of the cell apertures 20 to catch acid and return the acid to the cells of the battery, the smaller flange 44 being elongated to extend a substantial distance into the tubular flange 30 as seen in FIGURE 5. This provides a narrow annular space 44A between the outside of the flange 44 on the cover and the interior of the flange 30 on the base 24A, which allows gas to egress from the cell, yet prevents splashing of the electrolyte into the common chamber 32. In a similar manner the venting aperture 32A may be surrounded by a similar depending flange 48 for the same purpose. If desired, the smaller depending flange 44 may be shortened to extend above the opening of the tube 30.

The gang vent plug disclosed is molded from acid resistant material which has suitable physical characteristics such as polyethylene or polypropelene.

During use of the gang vent plug, an operator releases the cover 26 by disengaging the latch members 26A and 26B and raises the cover about the hinges 28 to expose three of the cell venting and filling openings 20. After the servicing operation, the operator replaces and latches the cover in closed position. By this method, 12 volt or 6 volt batteries can be serviced by simple operations on the gang vent plug as shown in FIGURE 1.

What is claimed:
1. A gang vent closure for use with a multi-cell battery having a closed casing with a plurality of spaced-apart vent openings in its upper surface, said gang vent closure comprising, in combination, a longitudinally extending base member, a plurality of spaced-apart, depending tubular flanges on said base member spaced apart to coincide with the positions of said battery vent openings and having external surfaces dimensioned such that said tubular flanges will be frictionally retained in said vent openings to removably position said vent closure upon the battery, a cover member and a hinge connecting said cover member to said base member whereby said cover member is movable between an open position and a closed position, said cover member and said base member, when in closed position, defining an elongate chamber extending over said tubular flanges and battery vents, a pair of concentric circular baffles positioned upon the inner surface of said cover member above each of said tubular flanges on said base member when said cover is in closed position, the outer circular baffle having a diameter substantially equal to the diameter of the tubular flange below it and extending downwardly from said inner surface of said cover and terminating short of the upper edges of said tubular flange to provide a first restricted passage therebetween, the inner baffle having a diameter less than the diameter of said tubular flange and extending downwardly from said inner surface of said cover and into said tubular flange beyond its upper edges to provide a second restricted passage therebetween, and a venting aperture extending through said cover and positioned between each of said pairs of concentric baffles whereby, when said closure is positioned upon a battery and said cover is in closed position, gases may be vented from said battery through said vent apertures while battery liquid is prevented from splashing out through said venting aperture by said first and second restricted passages provided by said baffles.

2. The gang vent closure of claim 1 which further includes a circular baffle upon the inner surface of said cover circumjacent each of said venting apertures and extending downwardly from said inner surface of said cover and terminating short of the upper surface of said base member to provide a third restricted passage to further prevent battery liquid from splashing out through said venting apertures.

3. The gang vent closure of claim 1 wherein said first and second restricted passages are positioned at an angle to one another to impede splashing of battery liquid therethrough.

References Cited
UNITED STATES PATENTS

| | | | |
|---|---|---|---|
| 2,570,123 | 10/1951 | Heine | 136—177 |
| 2,629,760 | 2/1953 | Wells et al. | 136—177 |
| 2,716,147 | 8/1955 | Laughlin | 136—177 |
| 2,889,391 | 6/1959 | Marshall | 136—177 |
| 3,083,256 | 3/1963 | Slautterback | 136—177 |
| 3,161,548 | 12/1964 | Goldingay | 136—177 |

FOREIGN PATENTS 98,176  2/1940  Sweden.

ALLEN B. CURTIS, *Primary Examiner.*

WINSTON A. DOUGLAS, *Examiner.*

D. L. WALTON, *Assistant Examiner.*